United States Patent
McDonald

(10) Patent No.: US 9,752,796 B2
(45) Date of Patent: Sep. 5, 2017

(54) THERMAL STORAGE DEVICE

(71) Applicant: Basic Holdings, Cloghran, County Dublin (IE)

(72) Inventor: Alan McDonald, Lisburn (GB)

(73) Assignee: BASIC HOLDINGS, Cloghran, County Dublin (IE)

( * ) Notice: Subject to any disclaimer, the term of this patent is extended or adjusted under 35 U.S.C. 154(b) by 440 days.

(21) Appl. No.: 14/388,279

(22) PCT Filed: Mar. 26, 2013

(86) PCT No.: PCT/EP2013/056449
§ 371 (c)(1),
(2) Date: Sep. 26, 2014

(87) PCT Pub. No.: WO2013/144169
PCT Pub. Date: Oct. 3, 2013

(65) Prior Publication Data
US 2015/0055941 A1    Feb. 26, 2015

(30) Foreign Application Priority Data

Mar. 26, 2012 (GB) .................................. 1205302.1
Jul. 13, 2012 (GB) .................................. 1212547.2

(51) Int. Cl.
| | | |
|---|---|---|
| *F24D 15/02* | (2006.01) | |
| *F24H 1/18* | (2006.01) | |
| *F24H 7/00* | (2006.01) | |
| *G05D 23/19* | (2006.01) | |
| *F24H 7/04* | (2006.01) | |
| *F24H 9/20* | (2006.01) | |
| *G05F 1/66* | (2006.01) | |
| *F24H 7/02* | (2006.01) | |

(52) U.S. Cl.
CPC ........... *F24H 7/002* (2013.01); *F24H 7/0216* (2013.01); *F24H 7/04* (2013.01); *F24H 9/20* (2013.01); *F24H 9/2078* (2013.01); *G05D 23/1923* (2013.01); *G05F 1/66* (2013.01); *F24D 2220/2063* (2013.01); *Y02B 10/70* (2013.01)

(58) Field of Classification Search
None
See application file for complete search history.

(56) References Cited

U.S. PATENT DOCUMENTS

| | | | | |
|---|---|---|---|---|
| 4,193,271 | A | * 3/1980 | Honigsbaum | .......... B60H 1/005 |
| | | | | 165/104.13 |
| 4,234,782 | A | 11/1980 | Barabas et al. | ................ 219/365 |

(Continued)

FOREIGN PATENT DOCUMENTS

| | | | | |
|---|---|---|---|---|
| CN | 201688488 | | 12/2010 | ............. F24D 11/00 |
| DE | 23 34 156 | | 1/1975 | ............. H05B 1/02 |

(Continued)

OTHER PUBLICATIONS

International Preliminary Report on Patentability for International Application No. PCT/EP2013/056449, Oct. 1, 2014.

(Continued)

*Primary Examiner* — Thor Campbell
(74) *Attorney, Agent, or Firm* — Kusner & Jaffe

(57) ABSTRACT

An improved thermal store is provided. The thermal decouples the heat output from the thermal store from the energy provided to the heater.

19 Claims, 8 Drawing Sheets

(56) References Cited

U.S. PATENT DOCUMENTS

| | | | | |
|---|---|---|---|---|
| 5,956,462 | A | 9/1999 | Langford | 392/449 |
| 9,370,044 | B2* | 6/2016 | McDonald | G05D 23/1923 |
| 2006/0196631 | A1* | 9/2006 | Small | F25D 16/00 |
| | | | | 165/10 |
| 2009/0292402 | A1 | 11/2009 | Cruickshank, III | 700/287 |
| 2010/0004790 | A1 | 1/2010 | Harbin, III et al. | 700/291 |
| 2012/0111036 | A1* | 5/2012 | Campbell | F25B 25/005 |
| | | | | 62/115 |
| 2012/0152514 | A1 | 6/2012 | Takasaki et al. | 165/241 |
| 2013/0146587 | A1* | 6/2013 | McDonald | G05D 23/1923 |
| | | | | 219/494 |
| 2014/0174707 | A1* | 6/2014 | Lombardo | B60H 1/004 |
| | | | | 165/202 |

FOREIGN PATENT DOCUMENTS

| | | | | |
|---|---|---|---|---|
| EP | 0 084 614 | 8/1983 | | G05D 23/24 |
| FR | 2 523 697 | 9/1983 | | F24H 9/20 |
| GB | 1 201 606 | 8/1970 | | F24H 7/04 |
| GB | 1 365 882 | 9/1974 | | F24H 7/04 |
| GB | 2 265 705 | 10/1993 | | F24H 7/02 |
| GB | 2 355 518 | 4/2001 | | F24H 7/04 |
| WO | WO 2007/098526 | 9/2007 | | H05B 1/02 |
| WO | WO 2011/154521 | 12/2011 | | H02J 3/14 |
| WO | WO 2012/158211 | 11/2012 | | G05D 3/12 |
| WO | WO 2012/162646 | 11/2012 | | G06F 1/18 |

OTHER PUBLICATIONS

International Search Report and Written Opinion for International Application No. PCT/EP2013/056449, Jan. 27, 2014.
Partial International Search Report for International Application No. PCT/EP2013/056449, Jan. 18, 2013.
Office Action issued in connection with corresponding GB 1205302.1, Jul. 6, 2012.
Office Action issued in connection with corresponding GB 1212547.2, Oct. 3, 2013.
Office Action issued in connection with corresponding GB 1212547.2, Nov. 7, 2012.

* cited by examiner

THERMAL STORAGE DEVICE

FIELD

The present application relates to thermal storage devices and in particular to thermal storage devices configured to decouple the heat provided to the storage device from the output heat required from the storage device. Within the context of the present teaching the term thermal storage device includes but is not limited to the type of devices known as storage heaters and liquid cylinders.

BACKGROUND

Thermal storage devices such as storage heaters are well known as a source of electric heating. Traditionally they have operated under the principle that energy can be provided to the heater during specific periods of the day, and that supplied energy can be released from the heater during different time periods. As shown in the example of FIG. 1, the heaters comprise a heat store 120 in the form of bricks or other materials such as ceramic which is located within a housing 100 of the storage heater. The heatable material 120 is then heated using an electric element 110 so as to increase the temperature of the heatable material. This stored heat is then released continuously through a process of both thermal radiation and convection and conduction. The speed of heat transfer may be increased through use of a damper and/or in conjunction with mechanical fans. The heater is designed to release heat and typically has no more than 20% heat retention. It will be appreciated that industry standards define a storage heater as having such a heat retention rate.

Traditionally the use of storage heaters is prevalent in areas where the electricity network operator provides a two-tariff electricity meter. This allows the heating of the storage heater to be effected during periods of low cost electricity—such as during the night when the overall load on the network is less than peak times. The heating of the storage heater during this off peak period has to be sufficient to allow the heater to provide continuous heating to the area within which it is located during the intervals between heating. Typically these intervals can be as much as 12 hours. In a typical known mode of operation the heat output from the storage heater adopts a curve such as that shown in FIG. 2, which does not match the user demand for heat. As the heat is output from the storage heater in a continuous process, it has one peak output—shown in the example of FIG. 2 as occurring about 0900 in the morning. After that, its capacity to provide heat reduces with the result that when the user requires additional heat later in the day, the heater does not have the capacity to provide that heat.

To compensate for this discrepancy many heater manufacturers provide additional capacity for storing heat in their heaters. In this way the heat output of the storage heater is designed to be greater than that actually required. This is typically achieved by heating the storage materials to temperatures of the order of 700° C. While this provides additional heating capacity later in the evening, there is also continued wastage of heat during the non-use periods. This can also result in excessive heating of the room and a waste of heat.

It will be understood that there is a direct relationship between the energy input and the heat output of a conventional static storage heater which means the user has very limited control of heat output, typically no more than 15% of the total heat output. This makes the heater relatively unresponsive to changing weather conditions and user needs.

Many of these problems are discussed in GB2384300. This patent describes how operation of a traditional storage heater may be supplemented by a secondary heat source such as a radiant element which can be utilised to supplement the output of the main heat source—the storage material.

In the context of water cylinders, these are typically used as a source of domestic hot water. The dimensions of the water cylinder are selected so as to provide an adequate volume of hot water to a user within a prescribed time period—typically a 24 hour window. The energy used to heat the water within these known cylinders comes from a variety of sources including electrical, gas or oil powered boilers. It is also known to provide such cylinders with a primary source of energy and then use a secondary source for specific actions such as a top-up or where the primary source fails or is deactivated. Again the heat provided to this cylinder is directly coupled to the heat output expected from the cylinder.

SUMMARY

In accordance with the present teaching the energy provided to thermal storage devices is decoupled from the expected heat output required from these devices. In this way the thermal storage device may be used to absorb additional energy capacity available within a network during periods of excess availability. The energy stored by these devices thereby serves a dual purpose, its primary purpose of providing the desired heat—be that space heating or heating of domestic hot water and a secondary purpose of allowing a remote operator to tune the capacity of the network to the loads within the network.

Accordingly there is provided within the context of the present teaching a thermal storage device which decouples the energy provided to the storage device from the required heat expected from the device.

In the context of a storage heater, the present teaching provides a heater which is configured to primarily retain heat as opposed to leak the heat. In this way heat retention of the order of 60% may be provided. By configuring the heater to primarily retain heat, the release of that retained heat may be controlled to a greater degree than traditionally possible which allows the output of the heater to more closely match the usage requirements of a heater.

In the context of a hot liquid cylinder, the present teaching allows a use of that cylinder as a thermal storage device.

Accordingly a device, a controller, a heater and a cylinder as detailed in the independent claims are provided. Advantageous features are provided in the dependent claims.

These and other features will be better understood with reference to the following drawings.

BRIEF DESCRIPTION OF THE DRAWINGS

The present application will now be described with reference to the accompanying drawings in which.

DETAILED DESCRIPTION OF THE DRAWINGS

Figure 1:
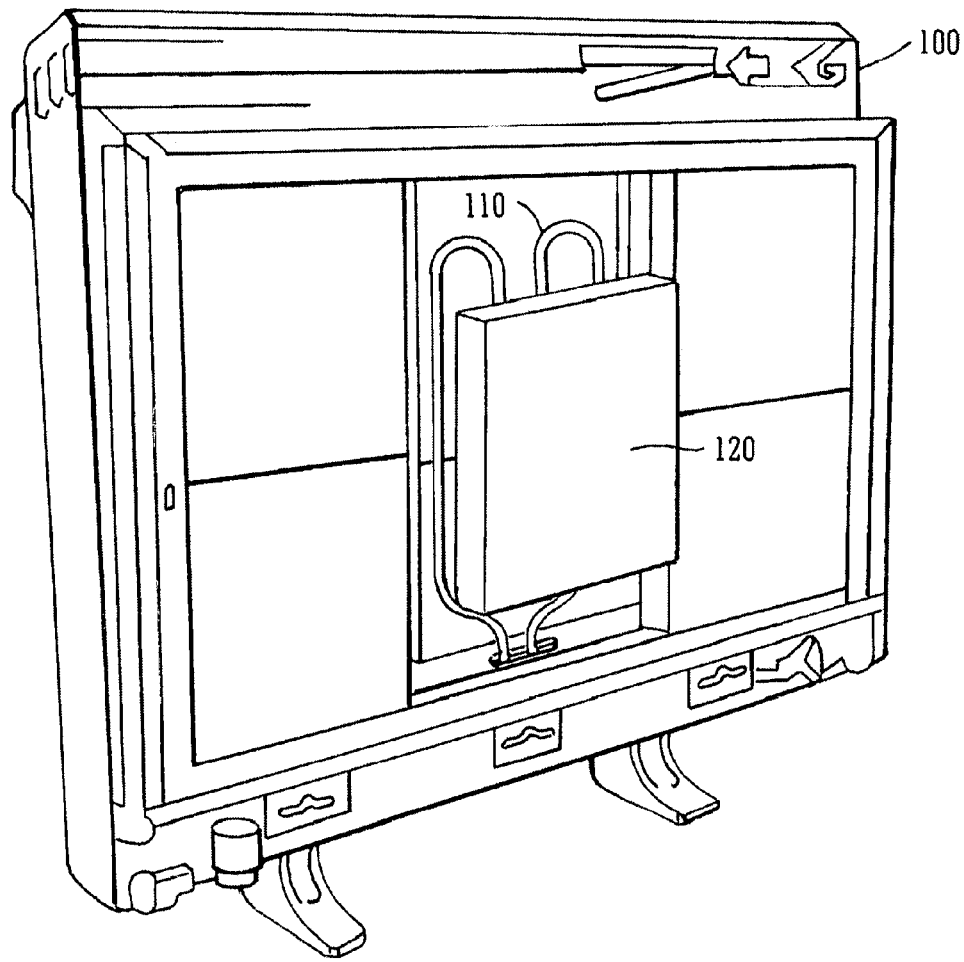
FIG. 1 is a schematic showing a known storage heater
Figure 2:
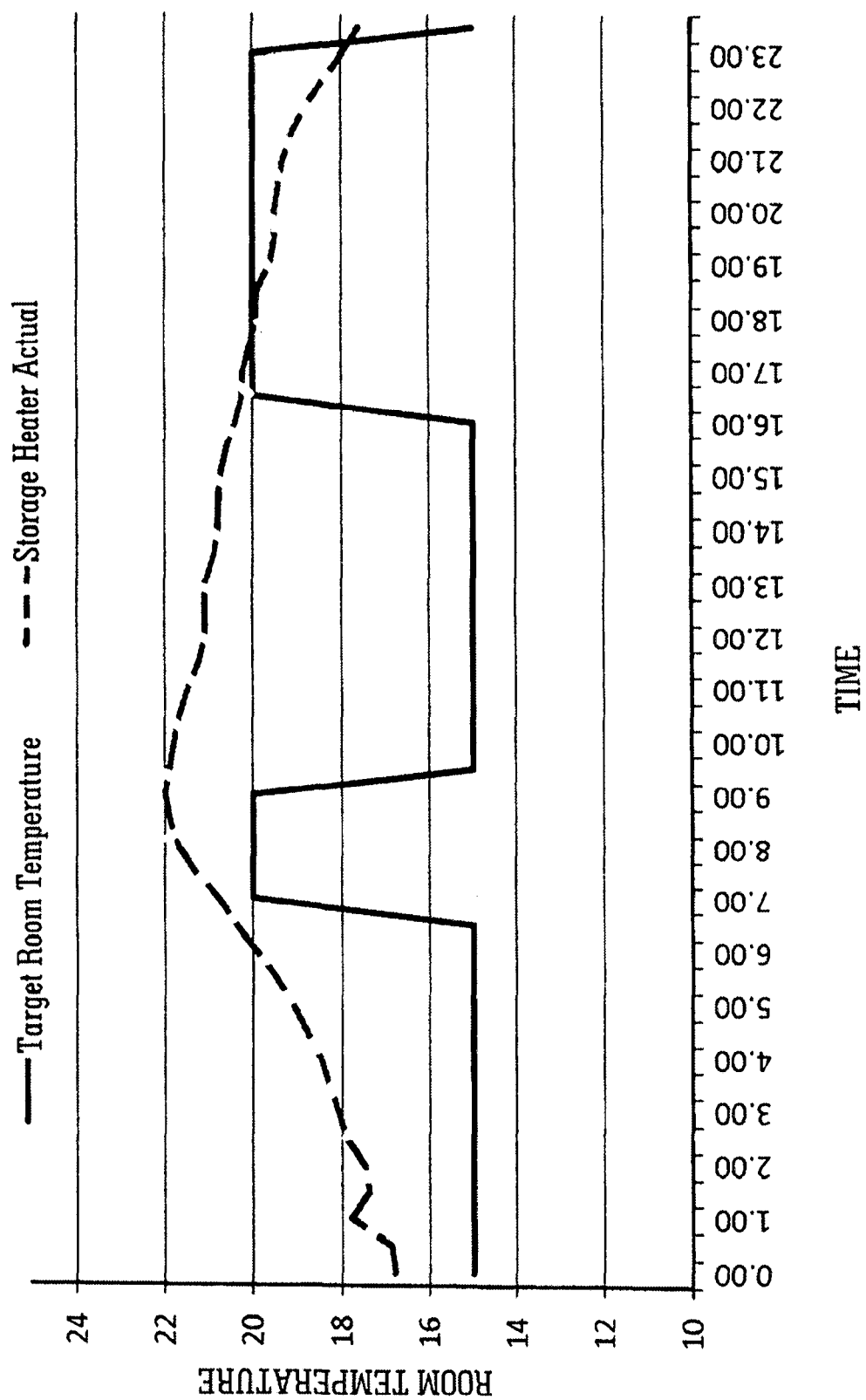
FIG. 2 is graph outlining the heat output of a conventional storage heater verses the desired heating of the room within which the heater is located.
Figure 3:
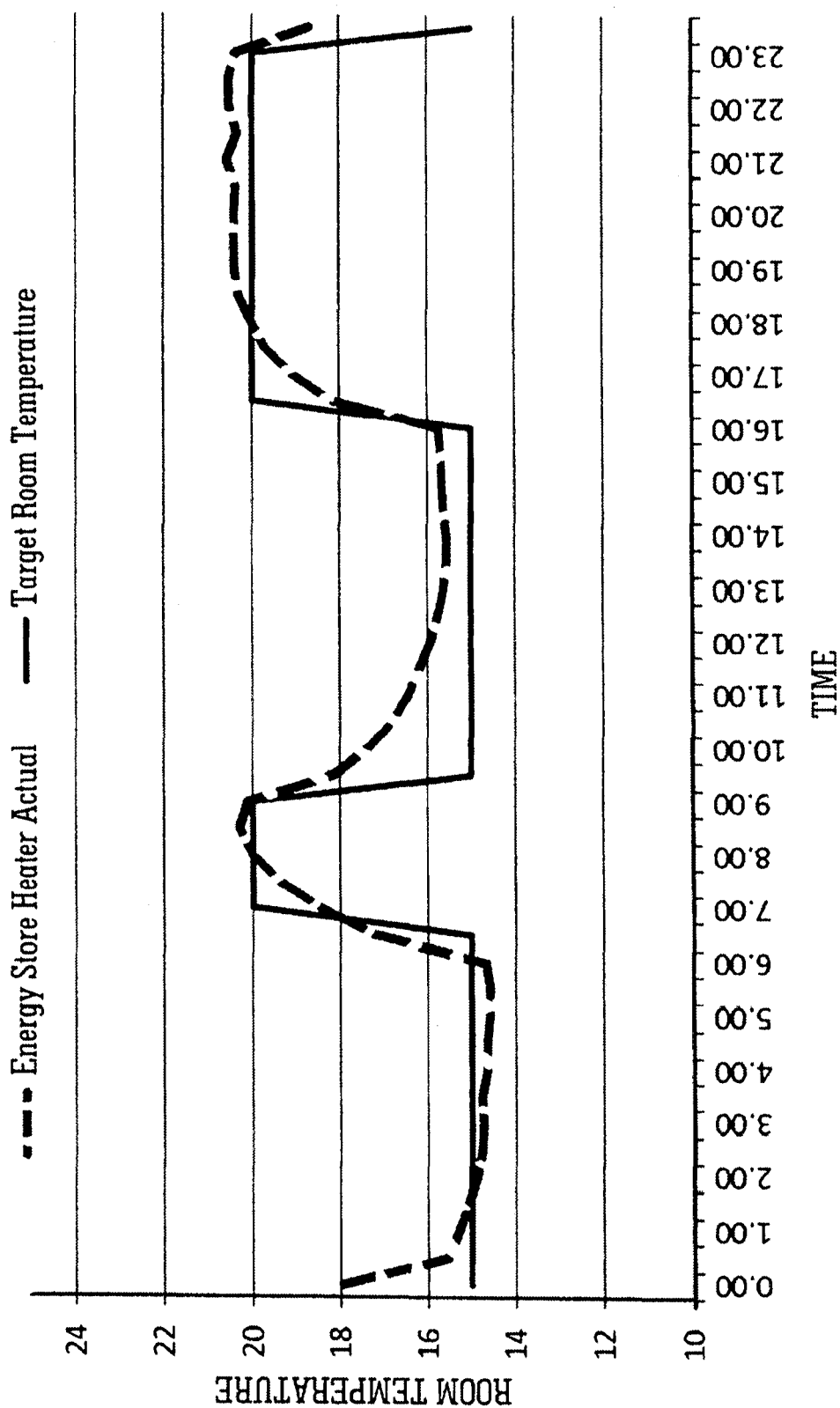
FIG. 3 is a graph, similar to that of FIG. 2 showing how the output of a storage heater in accordance with the present teaching more closely matches the desired heating.
Figure 4:
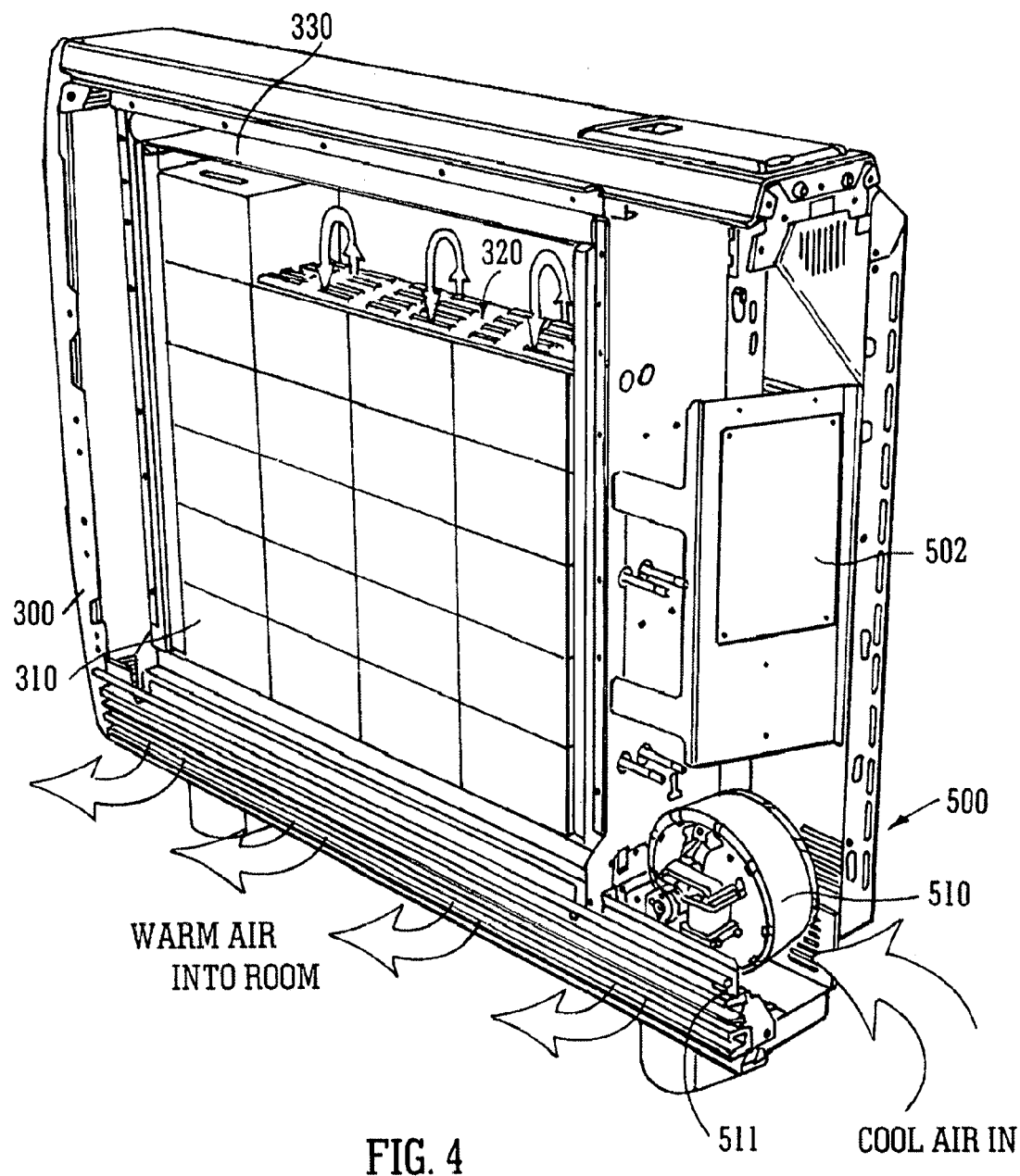
FIG. 4 shows an example of a storage heater in accordance with the present teaching which includes a fan configured to actively distribute the heat from the storage heater into the room within which the heater is located

Within the context of thermal storage devices, an exemplary storage heater in accordance with the present teaching will now be described with reference to FIGS. 4 and 5. A storage heater in accordance with the principles of the present teaching is configured to primarily store heat as opposed to leak that heat. In addition to the conventional components of a storage heater: a housing 300 within which is located a heatable material 310 which is heated by one or more electrical elements 320. A large volume of insulation 330 is provided about the heatable material so as to reduce the amount of uncontrolled heat that is lost by the heater. The insulation is desirably located around all vertical surfaces of the heatable material 310 and provides a high level of insulation around the sides of the heatable material. In addition a layer of insulation may be provided on the upper and lower surfaces of the heatable material. In this way the heatable material may be insulated on all six surfaces of the heatable material, albeit the level of insulation may not be the same for all surfaces. Typically the insulation will have a U value of the order of no more than 1.0 $W/m^2K$ for all surfaces except the base surface which will have a U value not exceeding 1.5 $W/m^2K$. Conventional heaters would typically have U values of 1.5-2.0 for the sides and greater than five for the base surface. In addition to using insulation to reduce primarily the conductive heat loss element of the heater, also other principles such as reflection could be used to reduce radiant heat components and an avoidance of gaps to reduce convection losses especially around the heated core. By appropriate selection of the level of insulation, a U value may be obtained sufficient to provide at least a 50% heat retention of heat within the heater between time periods within which energy is provided to the heater. For the purpose of making this selection, the ambient room temperature may be taken to be 20° C.

An example of a suitable material for use in provision of such high insulation is a micropore insulation panel such as sold under the MICROTHERM™ brand. The insulation is desirably such that no more than 50% of the heat input into the heater within a 7 hour charge period will be lost after a 17 hour non-charge and non-use period. Comparable values for existing heaters are of the order of 35-40% retention so it will be appreciated that this additional storage is highly advantageous in the controlled release of heat from a heater in accordance with the present teaching.

In addition to providing increased levels of insulation, a storage heater in accordance with the present teaching is configured to operate at much lower maximum heat storage temperatures than traditional heaters. As was discussed above in the Background portion, it is normal practice in storage heaters to have the maximum rated storage capacity at a maximum core temperature in the region of 650 to 700° C. This is because these heaters are designed to achieve the highest storage capacity within a given volume and a given storage capacity is directly proportional to the temperature swing of the heatable material. Accordingly, for a given core to provide a defined heat output over a defined time period it will have an associated rated temperature. It will be appreciated that this heat output is defined with respect to a particular ambient room temperature. In accordance with the present teaching the heatable material or core of the heater is configured to have its maximum rated storage capacity at a much lower temperature than conventional storage heaters. Typical values are in the range 550 to 580° C. The output of the heater is comparable with that of conventional heaters but this output is achieved by using a larger volume of core heatable material than traditionally used. In this way the volume of core heatable material has been increased to enable the maximum (rated) storage capacity to be achieved at a lower temperature swing. This has the advantages of reducing the rate of heat transfer through the insulation at a given storage capacity and provides the ability to safely increase the available storage capacity when required. Thus the core is intended for a particular (rating) heat output to be heated to a normal operating temperature of the core. It will be understood that whilst heat output is notionally dependent on the ambient room temperature, the variation is generally insignificant, since whilst normal room temperature may notionally vary between 15 and 23 degrees, the corresponding difference in heat output for a core temperature set somewhere between 550 and 580° C. is less than 2%. In general therefore, all ratings are determined with respect to a standard (ambient) room temperature.

While the storage heaters of the present teaching are nominally heated to a temperature that is much lower than a conventional heater they do have the capacity to absorb additional heat up to temperatures typically found in the conventional heater. This additional capacity can be utilised during periods when the network operator has a requirement to spill additional energy from the network and requires a device or devices to take up that additional capacity. Storage heaters represent an ideal device to take up the additional capacity within the network as they can be instantaneously activated. This activation is achieved through use of a dynamic powering of the heater, effected through a controller which interfaces the storage heater to the network operator.

The controller is configured to dynamically modify the heat take up and output of the storage heater. As was discussed above, a heater in accordance with the present teaching is configured to have a maximum core temperature of about 580° C. (termed "normal" core temperature) which is calculated on the basis of having sufficient capacity to provide sufficient heating for a winter day for 8 hours. This may be termed a first operating temperature of the heatable material or core of the heater. In contrast to the teaching of the prior art, the present inventor has determined that the charging of a storage heater should be related to the actual usage of the heater. In this way the controller monitors one or more of: historical data, rate of heat loss of the room, thermal characteristics of the room and actual operating usage of the device to determine the future powering requirements of the heater. It will be understood that actual operating usage may be determined through an adaptive or learning algorithm which reflects a user use of the device. The characteristics provide a dynamic core temperature device to provide optimum energy storage and minimise the maximum operating core temperature. This minimises static losses during non heating periods and the overall energy consumption. Where prior art heaters provided a heating of the storage heater to the maximum rating of the heatable material, the present teaching varies the temperature to which the heatable material is heated dependent on the usage and additional data. By reducing the "normal" temperature from the maximum heating rating of the heatable material to the first operating temperature, a storage heater in accordance with the present teaching is provided with the flexibility to increase the core temperature to a second operating temperature of the heater which is greater than the first operating temperature should actual usage of a device prove that that "normal" is not sufficient for the use of the device.

The controller is configured to allow a user to select a desired temperature within a prescribed time for the room in which the device is being used. The device will provide an output based on those selected parameters. By monitoring how the device has coped with the actual usage, the device may dynamically modify its powering requirements to ensure this usage pattern is facilitated. A controller provided in accordance with the present teaching may also vary the control algorithm utilised in accordance with available network tariff plans or regimes. In this way a first tariff plan may trigger use of a first algorithm and a second regime usage of a second algorithm.

It will be appreciated that in order to be able to increase the storage capacity beyond the rated capacity the elements have to be "over rated". For example, a heater with a rated storage capacity of 17 kWh running on a 7 hour off peak tariff requires 3 elements at 0.8 kW each. Based on a desired ability to increase the storage capacity by increasing the core temperature we then need:

17 kWh @580 deg C. core=20.5 kWh @680 deg C. core which requires 3 elements at 0.98 kWh It will be understood therefore that the electrical heating elements that are used for a storage heater in accordance with the present teaching are therefore over rated for the normal core temperature operation. Therefore while a traditional storage heater would maximise the length of the window that is used to effect a charging of the storage heater—typically a 7 hour charging window—a heater in accordance with the present teaching can provide heating to a "normal core temperature" of 580° C. in a reduced time period. For example having "over rated" the elements, it is possible within the context of the present teaching to achieve a normal core temperature of 580° C. from cold in 5.8 hours instead of 7 hours.

By overrating the heating elements which reduces the time required to achieve the normal core temperature operation, it is also possible in accordance with the present teaching to provide an improved back charging regime. Back charging relates to providing power at specific times. For example as was discussed above, in order to provide the necessary heat output the following day typical storage heaters require a 7 hour powering window. Many network operators require powering at specific times for example during the last hour of the powering window. Back charging is a concept where a subset of the powering window is determined and that subset is then shifted toward the end of the powering window to ensure that the time period between the provision of charge and the leakage is minimised. In accordance with the present teaching the controller is configured to determine how much power needs to be provided to shift the core temperature to the required core temperature and that defines a power window. The power window can then be subdivided into individual sections which are then available for the network operator to provide power as required. This calculation of a power window is a dynamic feature which will be constantly updated as power is provided.

The calculation of a power window may also interface with a pre-stored value or table of a plurality of back-charging algorithms provided within the storage heater. In this way a network operator may select an appropriate algorithm for that specific device—either by a setting provided at install or by providing a remote signal.

It will be appreciated that the foregoing is one example of how to vary the power provided to the storage device. In another configuration which may or may not be used in conjunction with the back-charging is to provide a variable power input to the storage heater. This may then be used to adjust the input power to match the heating requirement and the charging window. An example of how this may be achieved is through use or 2 or more independently controlled elements which may be used in conjunction with a switching regime whereby individual ones may be activated in preference to others. A look up table or the like could be used to dictate the switching regime adopted.

Using the example above to achieve maximum energy efficiency we want the core to reach its maximum target temperature within the last hour of the available charge period it will therefore be necessary to delay the start of charging if less than 20.5 kWh of storage capacity is required. The length of delay will be proportional to the reduction in storage capacity which will be dynamically calculated by the controller.

Figure 5:
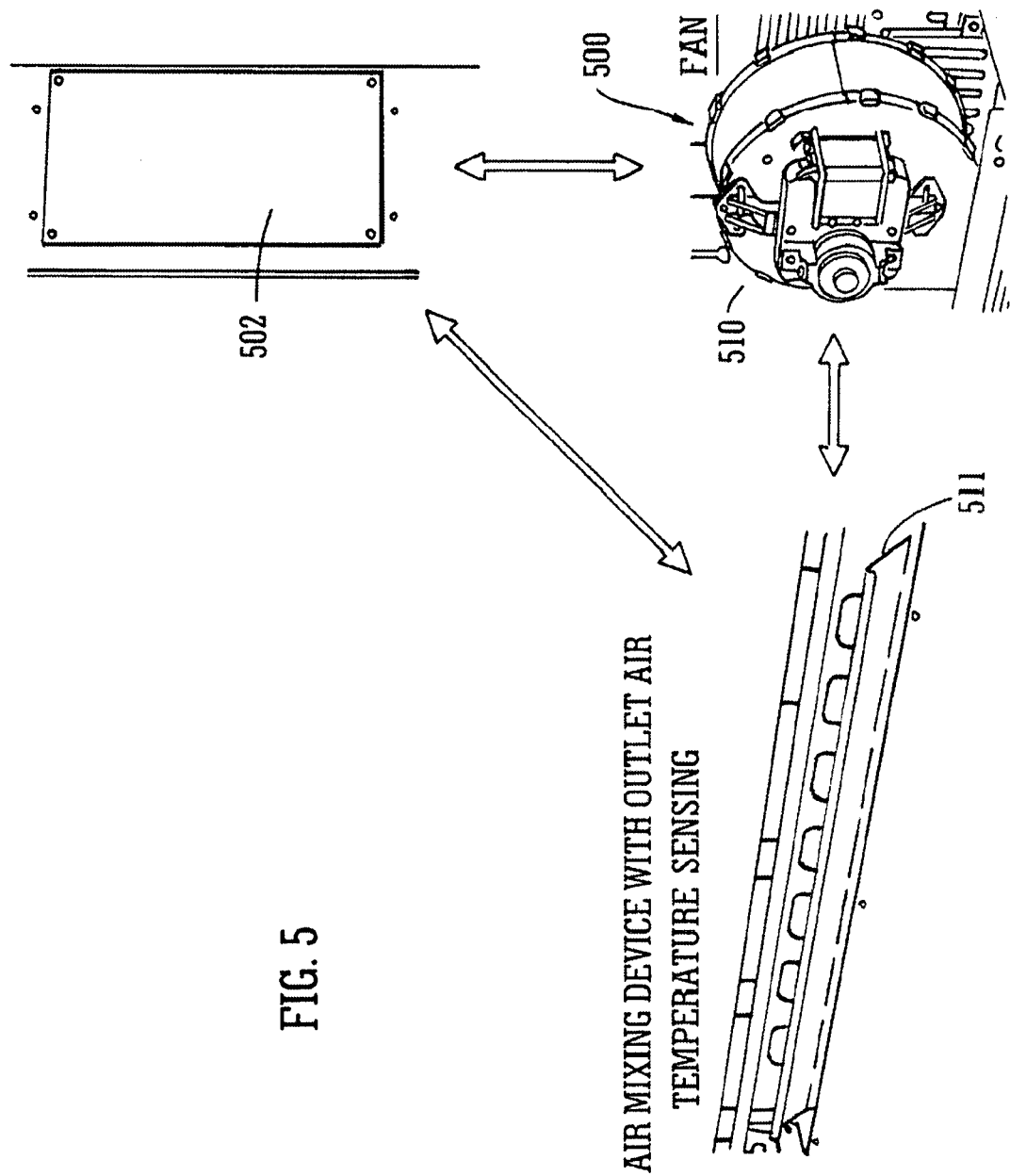
FIG. 5 shows in detail specific components of the storage heater of FIG. 4.

FIG. 5 shows in more detail a fan arrangement 500 which may be provided with a storage heater in accordance with the present teaching. Such a fan was visible in the schematic of FIG. 4 but is shown in more detail in FIG. 5. The fan arrangement comprises a fan 510 which is coupled to a controller 502 which can be used to selectively operate the fan 510. This may be used in response to a user input and/or during periods when the heater is required to provide additional heat. The fan provides for an active distribution of the heat out of and away from the heater. The fan may be used in combination with a mixing flap 511 whose movement can be used to vary the volume of hot or cold air that is combined and distributed out of the heater. In accordance with the present teaching a closed loop system is provided whereby the fan and mixing flap cooperate with one another independently of the core temperature. It will be appreciated that the position of the flap may modify the volume of cold air that is mixed with hot air from the core. It will also be understood that the speed of the fan may affect the volume of air that is distributed out of the heater. In accordance with the present teaching a temperature sensor is provided and its output is coupled to the controller. Dependent on the temperature sensed and the required temperature output of the heater, the controller may be configured to vary one or both of the fan speed and mixing flap position to vary the heat output from the heater. This dynamic closed loop arrangement decouples the heat output from the heater from the actual core temperature of the device.

Another advantage of a heater in accordance with the present teaching is that by providing a set temperature at which the device is typically powered to operate at which is less than conventional temperatures, a level of additional capacity is available should the network operator need to shed additional power. In this way the storage heater controller may be configured to adjust a preset set-point of the storage heater thereby allowing the storage heater to operate outside the limits of the preset set-point. This is particularly advantageous where the network operator is operating using energy sources whose timing of supply varies—such as renewable resources based on wind or wave energy. By having additional capacity it is possible to trigger, through a remote signal, the controller to effect a charging of the storage heater beyond the normal core temperature. In combination with the dynamic heating of the storage device, if that additional heat is not used the following day, then during the next charge period the controller may reduce the charge as there is less energy required to bring the heatable material back to the normal core temperature.

A storage heater in accordance with the present teaching provides a number of advantages over conventional storage heaters. By incorporating a controller which facilitates the dynamic charging of the heater it is possible to tune the energy input to the heater dependent on the actual usage and forecast usage of the heater. In contrast to conventional heaters where the heaters are configured to always heat to the maximum rated temperature of the heatable material, the present teaching provides a normal core temperature that is less than the rated temperature. The controller of the heater then provides for a heating of the storage heater to that normal core temperature. It will be appreciated that the term normal in this context means that for a stated heat input, which is how storage heaters are generally defined, there is an associated nominal normal temperature for the core. The actual value of that normal core temperature may be dynamically modified based on one or more of a variety of parameters including usage patterns of the heater or forecast conditions.

While the heatable material is typically heated to a lower temperature than its rated temperature, the electrical elements that provide that heating are rated to allow a heating to the maximum temperature. In this way heating to the normal core temperature is achievable in a reduced time window to that available. In this way the controller can dynamically modify the time period within the network operator designated window within which power is taken by the heater. In this way an improved back charging regime is achieved.

The controller may also be configured to monitor the actual usage of the heater and its capacity to provide sufficient heat to adequately heat the room within which it is located. In one configuration the controller is configured to learn the thermal characteristics of the room through for example a sensing of the temperature of the room and its variance during periods of the day and/or its reaction to heat being provided to the room. In accordance with the present teaching, the controller may provide a thermal characteristic based on a computation of a rate of rise or fall of temperature with respect to time. In this way the controller provides a much more accurate assessment of the actual thermal characteristic of the room and can modify the heat output of the thermal storage device accordingly. The use of rate of change information provides a more accurate characterisation of the room than prior art techniques that utilised external temperature sensors and/or room sensors which provide an absolute temperature value in determination of the charge requirements for the heater.

Features and advantages of the present teaching have heretofore been described with reference to an exemplary thermal storage device, a storage heater. While certain benefits are specific to such a storage heater, it will be appreciated that these and other aspects can be advantageously employed with other types of thermal storage devices—such as for example a hot water cylinder. For example, a hot water cylinder in accordance with the present teaching may include two or more independently switchable electrical heating elements whose actuation can be tailored to the demand—be that the current capacity of the cylinder to provide sufficient domestic hot water and/or needs of the network to shed energy to thermal storage devices that are coupled to the network.

Within this context of thermal storage devices that are provided with dynamic response characteristics, the present teaching provides an improved controller which is used to selectively activate the thermal storage devices- or components thereof. In one aspect, the controller may determine the amount of heat that needs to be stored in order to meet the usage requirements of the device to which it is coupled. This may be achieved through historical monitoring of the energy required to meet the desired operating temperature of the room. It may, as part of this analysis, segment the historical period into periods of use and non-use. In this way a more accurate determination of the response of the device to meet the load requirements during the periods of use is achieved. This may be done over a limited time window—for example the preceding three days. It may also utilise forecast data based on the expected conditions within which the device will be operating. This could be used in combination with the thermal characteristic of the room information that is determined as discussed in previous passages.

In certain configurations the controller is co-located with the thermal storage device which it is controlling.

The controller may be configured to read data from one or more of the thermal storage device and its operating location and can determine the required energy needed to adequately charge the device to meet the required usage of the device. This required energy can be considered representative of what is needed to charge the device to the first operating temperature of the device. In accordance with the present teaching, the device may also have a capacity to be heated above that operating temperature—up to a second operating temperature of the device. The controller in the context of the present teaching can be provided in communication with a remote operator—such as a network operator or an energy aggregator to provide that remote operator with an indication of the capacity of the storage device to absorb additional energy. In response to receiving that signal, the remote operator is provided with information as to where energy may be delivered in a future period and the amount of energy that could be provided in that period.

Figure 6A:
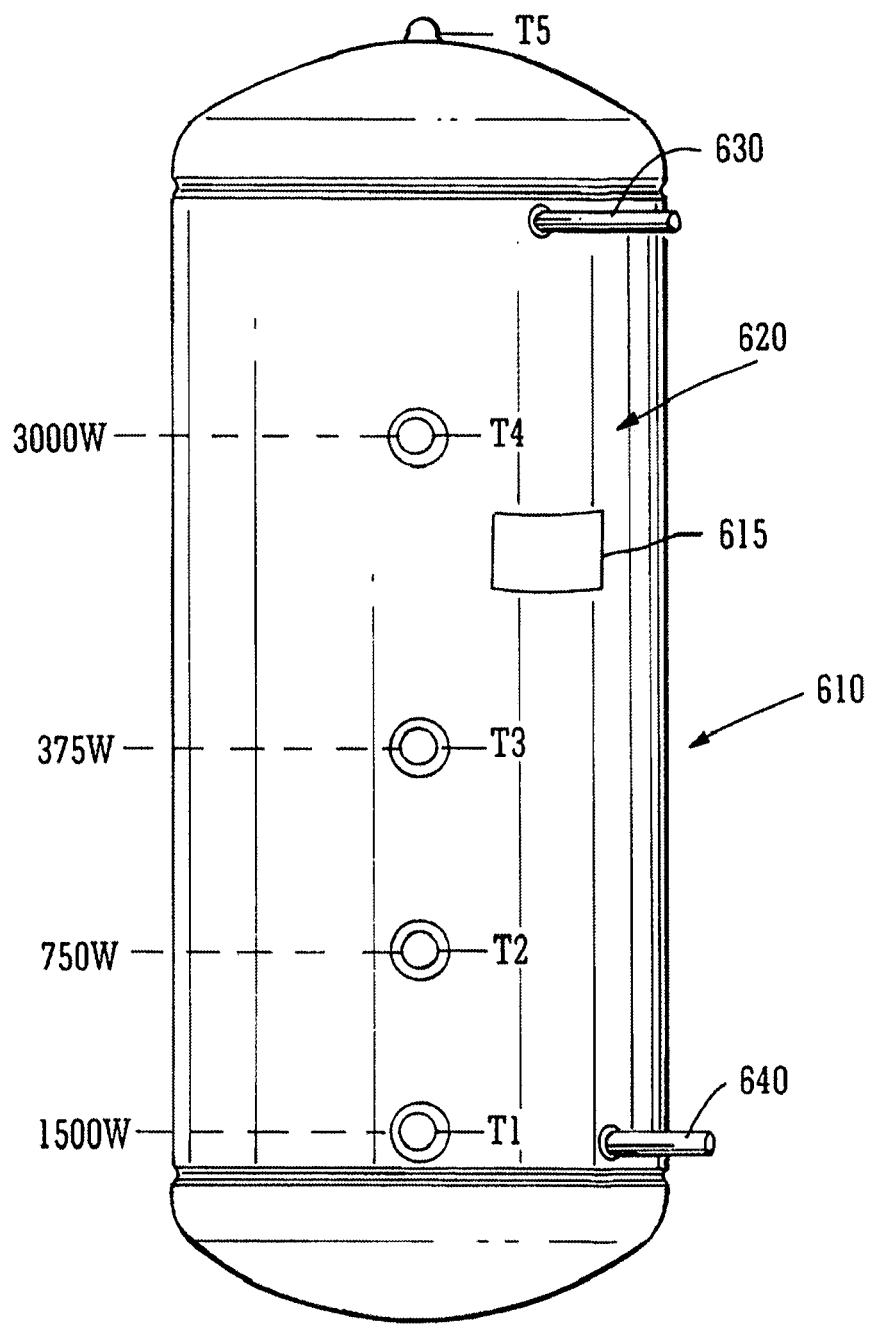
FIG. 6A is an example of a hot liquid cylinder provided in accordance with the present teaching.

As an example of how the thermal storage device may be other types of thermal storage devices—other than storage heaters, FIG. 6a shows an example of a hot liquid cylinder 610 that is coupled to a controller 615 in accordance with the present teaching. The controller could be physically co-located with the cylinder or could be in communication with the controller. The cylinder could be of any form that uses a heating element for the heating of the liquid within a cylinder such as for example those based on Vented and unvented systems
    Direct cylinders
    In direct cylinders
    Thermal stores It will be appreciated that the dimensions or volume, V, 620 of the cylinder may vary from for example 50 liters up to 300 liters or more. In this example, the total volume V has 5 constituents V1 to V5. The cylinder also comprises flow 630 and return 640 tappings that allow the cylinder to provide at least one of domestic hot water and/or domestic heating. In the schematic only one set of flow and return tappings are provided and it will be appreciated that dependent on the actual intended use of the cylinder that additional flow and return tappings may be required.

In the absence of the controller, such a cylinder which is used as a reservoir for hot water for one or more of domestic hot water or domestic heating will be known to those in the art. Such cylinders may also employ one or more internal coil loops within the volume 620 of the vessel. These allow a heating of the liquid within those loops while maintaining each of the loops as a closed circuit relative to the other loops. The heating element used for a heating of the liquid may include an electrical heating element which is coupled to the controller 615. This may be immersed within the volume of liquid within the cylinder. Whilst, the above description has been described with respect to a direct electrical heating arrangement employing a resistive element. Another example of an electrical heating arrangement, in which heat is provided indirectly, i.e. not directly by virtue of a heating element resistance, would be an electrically powered heat pump, whose operation would provide a flow and return of liquid into the cylinder to effect a heating of the liquid within the cylinder. The cylinder could also be coupled to a gas or oil fuelled boiler.

While not shown in FIG. 6a, a cylinder in accordance with the present teaching may also equally employ such additional loop circuits—each associated with a dedicated flow and return tapping accessible on the outside of the cylinder.

Traditionally the liquid within these cylinders is water. The present teaching also provides for the liquid within the cylinder to be a liquid other than water. It will be appreciated that when used as a thermal store, the capacity of the cylinder to store energy is dependent on the heat capacity of the liquid used and the maximum temperature that liquid can be heated to. In accordance with one aspect of the present teaching, a hot liquid cylinder comprising oil is provided. The use of oil as opposed to water allows a heating of the liquid to a higher temperature which allows for the same volume cylinder to store more energy than one holding water.

In this way, while it is well understood that water is an useful medium within which to store energy, other liquids such as oil, could also be used within the context of the present teaching. For the following discussion, water will be mentioned as an exemplary liquid to be used.

Table 1 below shows an example for differing properties of a typical cylinder.

TABLE 1

| Storage capacity @ 65C | water-heat loss over 24 h |
|---|---|
| 100I:6.1 kWh | 0.9 kWh |
| 125I:7.6 kWh | 1.0 kWh |
| 150I:9.2 kWh | 1.1 kWh |
| 175I:10.7 kWh | 1.3 kWh |
| 210I:12.8 kWh | 1.4 kWh |
| 250I:15.3 kWh | 1.7 kWh |
| 300I:18.3 kWh | 1.9 kWh |

The controller 615 desirably offers much of the same functionality as the heretofore described controller for the storage heater. For example the user can set the desired water temperature for the tank and could define expected desired usage of that water. For example the user could define that it is expected that the cylinder provide sufficient volume of hot water for 2 showers in the morning and 1 bath in the evening.

Rather than expect the user to define how many liters this will represent the controller is desirably configured to translate the user use requirements to actual volume of water required. This may be a simple computation of estimated volumes of water for showers and baths to calculate the needed water volume. in a preferred arrangement the controller may be configured to compute actual usage at specific time periods to determine how much hot water is used and can therefore dynamically adjust the minimum required water volume. The present teaching provides a determination of how much water is left within a specific cylinder subsequent to taking water from the cylinder. Where the liquid within the cylinder is not the liquid used for the domestic hot water, i.e. the liquid in the cylinder is used to heat water which is then provided as domestic hot water, the present teaching provides a determination of how much energy is stored by the liquid within the cylinder to allow for a heating of water for an expected desired usage.

In an exemplary configuration the controller will typically interface with two or more temperature measurement devices T1 to T4 which are spatially separated within the cylinder to provide an indication of the temperature of the water or the other liquid within the cylinder at two or different locations. The specific example of FIG. 6 shows four temperature measurement devices T1, T2, T3, and T4 and these are spatially distributed to measure the temperature in the tank or cylinder at 4 positions along the vertical height of the tank. Within this exemplary cylinder and the present teaching is not to be limited to the features of the exemplary cylinder or the following equations, three immersion elements are provided and again are located at different positions within the cylinder. The temperature T5 is a virtual temperature based on the T4 and the cylinder properties.

The total rated power of the cylinder will be that power when all three elements are switched on and using the following table which details exemplary individual ratings of three elements:

| | |
|---|---|
| Element 1 | 1500 W |
| Element 2 | 750 W |
| Element 3 | 375 W | the total rated power of the cylinder will be 2,625 W. These elements may be individually switched using for example a TRIAC.

In order to determine the instantaneous power I_P of the cylinder the following equation may be used:

$$I\_P = \frac{S1 \cdot 1500\ W + S2 \cdot 750\ W + S3 \cdot 325\ W}{2625\ W} \cdot 100\%$$

Where

| I_P | % | Instantaneous power |
|---|---|---|
| S1 | – | Status of TRIAC 1, 1 or 0 |
| S2 | – | Status of TRIAC 2, 1 or 0 |
| S3 | – | Status of TRIAC 3, 1 or 0 |

Using such a cylinder it is also possible to compute the total energy stored now. The energy stored now Q_now is expressed as function of the overall energy that can be stored in the cylinder in % and not as absolute value in Wh. The following equations allow the calculation of the currently stored energy in the domestic hot water cylinder.

$$Q\_{now} = \left[ \sum_{n=1}^{n=4} Q\_VI_n \cdot l_{n+1} \right] \cdot \frac{1}{E\_s\_c} \cdot 100\%$$

-continued

Where:

| | | |
|---|---|---|
| Q_now | % | Current stored energy |
| Q_VIn-In + 1 | Wh | Energy stored in any given sub volume of cylinder |
| E_s_c | Wh | Energy storage capacity |

$$Q\_VI_n - I_{n+1} = (V_n - V_{n+1}) \cdot r \cdot c_p \cdot \left(\frac{t_n + t_{n+1}}{2}\right) \cdot \frac{1}{3.6}$$

Where:

| | | |
|---|---|---|
| Q_VIn-In + 1 | Wh | Energy stored in any given sub volume of cylinder |
| Vn | m3 | Heatable volume at position $n$ |
| Vn + 1 | m3 | Heatable volume at position $n + 1$ |
| r | kg/m3 | density of water 993 kg/m3 |
| cp | kJ/kg/K | heat capacity of water 4.18 kJ/kg/K |
| tn | ° C. | Temperature at position $n$ |
| tn + 1 | ° C. | Temperature at position $n + 1$ |
| 1/3.6 | Wh/kJ/s | unit conversion factor |

Whereas T1 to T4 are actually measured values as computed using the thermocouples, T5 is a calculated temperature based on T4. To calculate T5 the following applies:

```
IF
        45° C. ≤ T4 < 60° C.
    THEN T5 = 60° C.
    ELSE
        T5 = T4
END
```

The energy required for the next period will be based on a rolling 3 day average of previous days. The period has not been defined but it is assumed that the period is 24 hrs. It is therefore proposed to use the date/time signal from the LIC to re-set the relevant values at 00:00 hours to commence the next period. To be able to calculate Q_future, it is necessary to store Q_now at in principle any arbitrary time of the day but at the same time every day. It is suggested to set this time to 23:59 o'clock as this denotes the end of a day. On a rolling basis, the last 4 days have to be stored (Q_now_d-n where 1≤n≤4). In addition to considering Q_now, also the instantaneous power value I_P has to be integrated over the agreed period, i.e. 24 hours, I_P_24 (I_P_24_d-n where 1≤n≤3).

$$Q\_future = \sum_{n=1}^{n=3} (Q\_d - n)/3$$

Where:

| | | |
|---|---|---|
| Q_future | Wh | Energy required in next period |
| Q_d-n | Wh | Energy requirement of previous period |
| N | – | Period counter |

$$Q_{\_d-n} = Q_{\_now\_d-n} + I\_P\_24_{\_d-n} - Q_{\_now\_d-(n-1)}$$

Where:

| | | |
|---|---|---|
| Q_d-n | Wh | Energy requirement of previous period |
| n | – | Period counter |
| Q_now_d-n | Wh | Energy stored now at repeated time (23:59) |
| I_P_24_d-n | Wh | Integrated instantaneous power for period |

$$Q_{\_now\_d-n} = \sum_{n=1}^{n=4} Q\_VI_n - I_{n+1}$$

Where:

| | | |
|---|---|---|
| Q_now_d-n | Wh | Energy stored now at repeated time (23:59) |
| Q_VIn-In + 1 | Wh | Energy stored in any given sub volume of cylinder |

For calculation of Q_VIn-In + 1 see above.

$$I\_P\_24_{\_d-n} = \int_{00:00}^{23:59} S1 \cdot 1500 \text{ W} + S2 \cdot 750 \text{ W} + S3 \cdot 325 \text{ W}$$

Where:

| | | |
|---|---|---|
| I_P_24_d-n | Wh | Integrated instantaneous power for period |
| S1 | – | Status of TRIAC 1, 1 or 0 |
| S2 | – | Status of TRIAC 2, 1 or 0 |
| S3 | – | Status of TRIAC 3, 1 or 0 |

The user may be provided with one or more modes of operation of the cylinder. For example in the context of a three mode operation the user may be provided with the capacity to:

1. User sets max temp and minimum water required and power utility can heat cylinder to max temp whenever they want, but they need to provide minimum water volume when needed
2. User allows power utility to set max water temp and user sets minimum water requirement. Otherwise as above
3. User doesn't allow power utility to intervene and sets time when he want the tank charged.

Within this context the user will typically still retain the capacity to override and switch on boost elements to increase the stored heat within the cylinder.

Figure 6B:
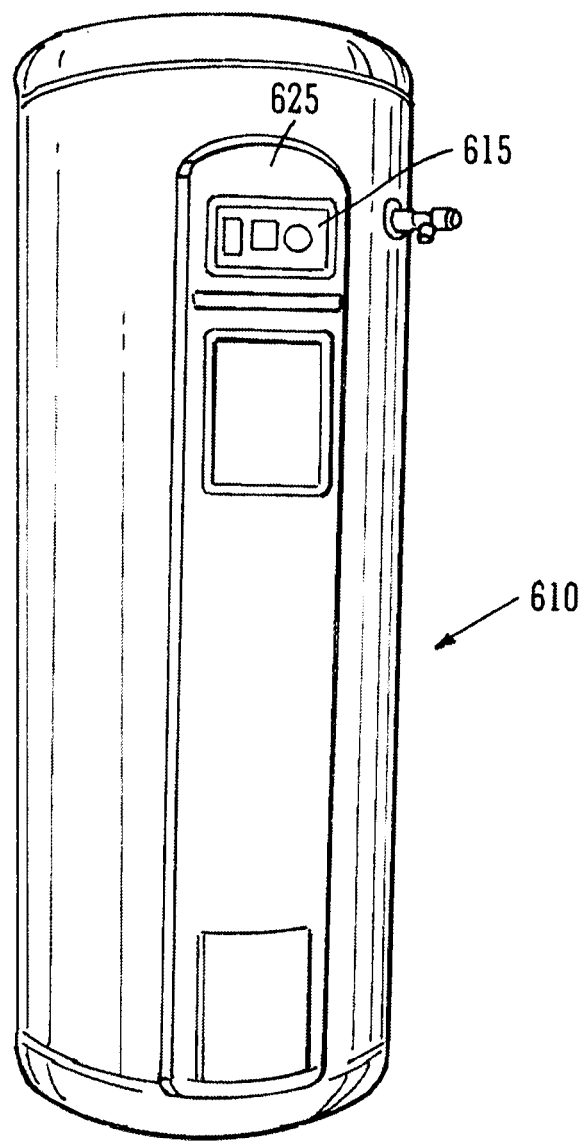
FIG. 6b is another example of a hot liquid cylinder incorporating a control panel with a display of operating parameters of the cylinder.

The cylinder and/or controller may include a display 625—shown in the exemplary figurative representation, FIG. 6B as being located on the cylinder to provide a display of how much hot water is in the tank with for example one or more graphical indicators.

In common with the controller for the storage heater, the controller for the hot water cylinder will desirably include the capacity to communicate bi-directionally with a power utility or some other power intermediary. This may include the capacity to:

Receive commands remotely sent from the power utility
Report back storage volume left
Report back forecast expected load on the device within a prescribed future period.
Operating status of cylinder, i.e. ON/OFF/AWAY As part of this functionality the controller may be configured to calculate one or more of:

How much hot water is in the tank

How much more energy can be stored in the tank until the max set temp is reached How much hot water, energy and money was used over a historical time period such as for example over the last week, months, year The controller will typically be configured to ensure that there is always enough hot water is supplied—in a similar fashion to how the controller of the storage heater device is configured to ensure there is sufficient heat to provide heat to the room within a prescribed future period. This may be achieved through for example electronic control of a boost element within the water volume which is selectively activated on determination that there is enough hot water.

Figure 7:
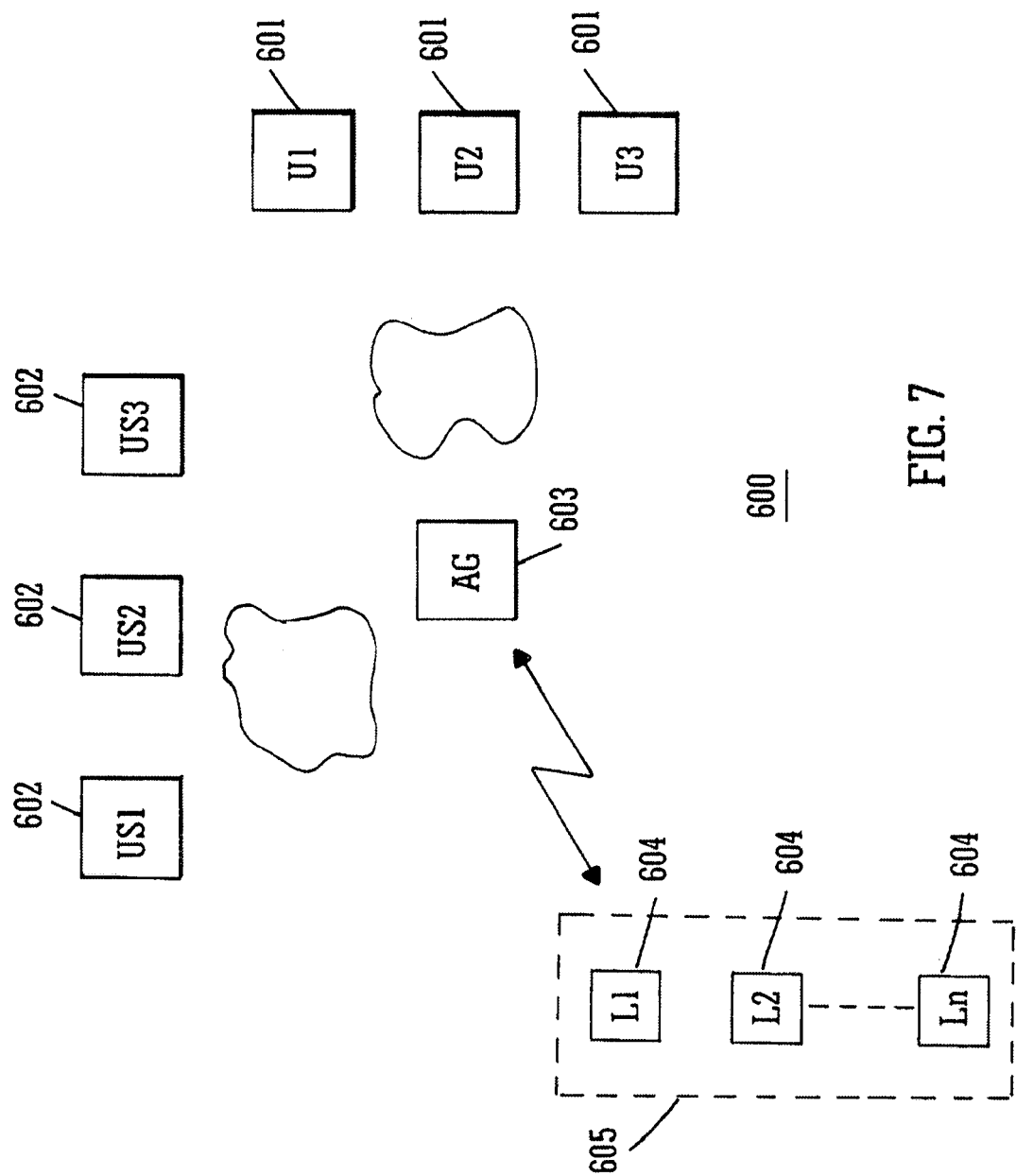
FIG. 7 shows an example of a network architecture employing a plurality of thermal storage devices in accordance with an aspect of the present teaching.

FIG. 7 shows an example of how such devices could be used in the context of demand response for stabilising the grid. Grid stability within an electrical grid is a well-known problem and with the advent of alternative sources of energy the management of supply and demand is becoming more problematic. It is known to provide incentives for load shedding in response to a request from a demand response provider. In the example of FIG. 6 a network arrangement 600 comprises a plurality of utility providers 601, U1, U2, U3 which are exemplary of electricity generators such as utility companies. These companies could vary from each other in the nature of how they generate electricity—for example using oil, gas, renewable resources such as wind or wave, or nuclear power. Dependent on the nature of the local infrastructure each of the utility providers may overlap in how they generate the power, but differ in the price or conditions that they offer. They are common in that they are net providers of electricity.

Also shown in the network are a plurality of power users 602, US1, US2, US3. These are representative of net users of electricity and common examples would include large industry, local authorities, hospitals and the like. Each of these have a requirement for energy.

Within the context of matching the output of the utility providers 601 with the users 602 it is known to provide aggregators 603, AG or grid controllers. An aggregator matches the forecast availability of power with the forecast need for that power and then resells the power generated to the user. It is known to provide a high level of granularity on this matching such that individual time slots in a future period can be matched with both utility providers and users. However, by definition electricity is difficult to store and has to be available on demand. As a result, it is not possible, under normal operating conditions where demand and supply vary enormously, to keep it in stock, ration it or have customers queue for it.

Where there is a mismatch there is a possibility of either the grid frequency varying or the need to either add or remove generation or load. This can be difficult to achieve in a dynamic real time environment.

In this context, the pricing offered within this time period may include penalty clauses if the utility company cannot match its obligations. To address this problem, the present teaching provides a plurality of load devices 604, L1, L2, Ln, which are in communication with the aggregator 603. Each of these devices are representative of the thermal storage devices heretofore described. The individual devices may be configured to communicate with the aggregator. In another configuration the information from a plurality of devices may be pooled centrally into a single data module 605 which then acts as an intermediary between the individual devices and the aggregator.

Such an arrangement differs from discussed event based software architecture currently discussed whereby domestic users can, in response to demand within the actual grid, reduce their use of power. In accordance with the present teaching, the load devices provide information to the aggregator in advance of the actual demand as to their expected usage and their capacity to operate outside that required window to assist the aggregator balance the needs of the network in a forecast. In addition, during the actual time period when power is being generated and used, the aggregator can activate or deactivate individual devices of the load devices to balance the demand.

In this way, using the information regarding future needs of the individual thermal devices and the current ability of the devices to match those needs—as was discussed above—the present teaching allows the load devices 604, 605 to communicate with the aggregator to advise of the actual and variable capacity of this specific area of the network in a future time period. The aggregator can then use this dynamic information as part of the actual forecast for the future period when determining the prices that are to be offered. During the actual distribution period the aggregator may elect to provide power to these load devices as appropriate. In this way excess load may be shed during periods of excessive electricity generation.

A further advantage of the capacity of the thermal storage devices per the present teaching to absorb additional heating is the capacity of the devices—and significantly arrays of such devices of similar characteristics—to be remotely triggered to take up additional energy should that be required by the network operator.

The words comprises/comprising when used in this specification are to specify the presence of stated features, integers, steps or components but does not preclude the presence or addition of one or more other features, integers, steps, components or groups thereof.

The invention claimed is:

1. A thermal storage device comprising:
   a core comprising a heatable material rated to a first operating temperature to provide a defined heat output within a 24 hour period, the first operating temperature being a normal operating temperature of the core;
   at least one electrical heating element;
   a controller configured to be in communication with a remote operator and in response to signals from the remote operator to selectively activate the at least one electrical heating element to effect a heating of the heatable material to the first operating temperature, and to selectively activate the at least one electrical heating element to effect a heating of the heatable material to a second operating temperature, the second operating temperature being greater than the first operating temperature;
   and wherein the at least one electrical element is rated to provide sufficient energy to the heatable material within a charging window to achieve a heating of the heatable material to the second operating temperature and the controller is configured to activate the at least one electrical element in at least one time window defined within the charging window, the duration of the at least one time window being less than the charging window.

2. The device of claim 1 wherein the controller is operable in first and second operating regimes, a first operating regime representing a normal operating regime within which the controller effects a heating of the heatable material to the first operating temperature and the second operating regime representing exceptional operating conditions of the heater within which the controller effects a heating of the heatable material to temperatures approaching the second operating temperature.

3. The device of claim 1 wherein the controller is configured to dynamically time shift the at least one time window during a charge period.

4. The device of claim 3 wherein the shifting of the at least one time window provides a back charging of the device.

5. The device of claim 1 wherein the controller is configured to determine how much power needs to be provided to shift a current core temperature to a required core temperature, thereby defining a power window.

6. The device of claim 5 wherein the controller is configured to sub-divide the power window into individual sections which are then available for a network operator to provide power as required.

7. The device of claim 5 wherein the controller is configured to dynamically update the defined power window during a provision of power to the device.

8. The device of claim 1 comprising a data store within which is stored one or more of a prestored value or table of a plurality of backcharging algorithms, the controller being configured to use the data within the data store in defining the time window.

9. The device of claim 8 configured such that selection of which of the one or more of a prestored value or table of a plurality of backcharging algorithms is used by the controller is determined at installation of the device or by providing a remote signal to the device.

10. The device of claim 1 wherein the remote operator is an electricity grid operator and the signals are dependent on a load within the grid.

11. The device of claim 2 wherein the controller is configured to monitor historical usage of the device and to vary the characteristics of the normal operating regime where the output of the device does not match the historical usage of the device.

12. The device of claim 2 wherein the controller is configured to interface with data representative of forecast expected usage of the device and to vary the characteristics of the normal operating regime.

13. The device of claim 1 being a storage heater.

14. The device of claim 13 comprising an insulator, the insulator having a U value sufficient to provide at least a 50% heat retention of heat within the heater between time periods within which energy is provided to the heater.

15. The device of claim 1 being a hot liquid cylinder, the heatable material being water or oil.

16. The device of claim 15 comprising means to compute how much available heat is left within the cylinder subsequent to a provision of hot water from the cylinder.

17. The device of claim 16 comprising a plurality of heat sensors configured to selectively provide an indication of the heat within specific volumes of the cylinder.

18. The device of claim 15 comprising a graphical display providing a user with information as to available volume of stored energy within the cylinder.

19. A thermal storage device comprising:
a core comprising a heatable material rated to a first operating temperature to provide a defined heat output within a 24 hour period, the first operating temperature being a normal operating temperature of the core;
at least one electrical heating element; and
a controller configured to be in communication with a remote operator and in response to signals from the remote operator to selectively activate the at least one electrical heating element to effect a heating of the heatable material to the first operating temperature, and to selectively activate the at least one electrical heating element to effect a heating of the heatable material to a second operating temperature, the second operating temperature being greater than the first operating temperature,
wherein the device is configured to communicate bi-directionally with the remote operator to provide forecast expected energy requirements of the device within a defined time window and to receive commands from the remote operator to effect a selective activation of the device.

* * * * *